(12) United States Patent
Choi et al.

(10) Patent No.: US 7,330,224 B2
(45) Date of Patent: Feb. 12, 2008

(54) LIQUID CRYSTAL DISPLAY DEVICE HAVING A WIRE SECURING MEMBER

(75) Inventors: Seong-Sik Choi, Suwon-si (KR); Gong-Sub Kwon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/174,736

(22) Filed: Jul. 6, 2005

(65) Prior Publication Data

US 2005/0243240 A1 Nov. 3, 2005

Related U.S. Application Data

(63) Continuation of application No. 10/146,064, filed on May 16, 2002, now Pat. No. 6,919,938.

(30) Foreign Application Priority Data

May 17, 2001 (KR) .......................... 10-2001-27063

(51) Int. Cl.
*G02F 1/1333* (2006.01)
(52) U.S. Cl. ..................................... 349/58
(58) Field of Classification Search ................. 349/58, 349/60–65; 362/26, 31
See application file for complete search history.

(56) References Cited

U.S. PATENT DOCUMENTS 5,280,372 A * 1/1994 Horiuchi ...................... 349/65
5,729,310 A * 3/1998 Horiuchi et al. ............. 349/62
5,815,227 A 9/1998 Lee ............................. 349/67

(Continued)

FOREIGN PATENT DOCUMENTS

JP 10-96923 4/1998

(Continued)

*Primary Examiner*—James A. Dudek
(74) *Attorney, Agent, or Firm*—Don C. Lawrence; MacPherson Kwok Chen & Heid LLP

(57) ABSTRACT

A liquid crystal display device capable of securing the lamp wire to the mold frame is disclosed. The liquid crystal display device includes a liquid crystal display panel for displaying an image, a back light assembly for providing a light to the liquid crystal display panel and a mold frame receiving the liquid crystal display panel and the backlight assembly. The back light assembly includes a light supplying part including a light source for generating a light and a lamp wire for supplying an electrical current to the light supplying part. A securing portion for securing the lamp wire is formed on a side surface or a rear surface of the mold frame, shaped as a groove or a depressed portion, and the lamp wire is secured to the securing portion in such a way that securing and separation of the lamp wire is performed with ease and simplicity. A pair of securing ribs are formed on the bottom of the securing depressed portions facing each other. The lamp wire is secured in the space between a pair of the securing ribs having a width less than a diameter of the lamp wire. Accordingly, a connection failure of the soldering portion of the lamp wire due to a sway of the lamp wire is reduced and the repeated process of securing the lamp wire in manufacturing the LCD device is no longer necessary.

6 Claims, 11 Drawing Sheets

U.S. PATENT DOCUMENTS

| | | |
|---|---|---|
| 6,016,175 A | 1/2000 | Kim .............................. 349/58 |
| 6,017,134 A | 1/2000 | Wang ........................... 362/252 |
| 6,108,060 A | 8/2000 | Funamoto et al. ............. 349/65 |
| 6,292,239 B1 * | 9/2001 | Nagamura et al. ............. 349/58 |
| 6,502,945 B2 | 1/2003 | Kim et al. ...................... 349/27 |
| 6,587,166 B1 | 7/2003 | Lee et al. ....................... 349/58 |
| 6,626,550 B2 * | 9/2003 | Choi ............................ 362/632 |
| 2001/0035923 A1 | 11/2001 | Cha et al. ...................... 349/65 |

FOREIGN PATENT DOCUMENTS

| | | |
|---|---|---|
| JP | 2000-331506 | 11/2000 |
| JP | 2001-42298 | 2/2001 |
| KR | 2001-39939 | 5/2001 |

* cited by examiner

LIQUID CRYSTAL DISPLAY DEVICE HAVING A WIRE SECURING MEMBER

CROSS REFERENCE TO PRIOR APPLICATIONS

This application is a Continuation Application from a U.S. patent application Ser. No. 10/146,064 filed on May 16, 2002 and issued as U.S. Pat. No. 6,919,938 which claims priority to and the benefit of Korean Patent Application No. 2001-027063 filed on May 17, 2001, which are all hereby incorporated by reference for all purposes as if fully set forth herein.

BACKGROUND OF THE INVENTION

1. Field of the Invention

The present invention relates to a liquid crystal display (LCD) device, and more particularly to a liquid crystal display device having a wire securing member that can secure a lamp wire to a mold frame and hold back free sway of the lamp wire to prevent damage to a soldering portion and shorting of the lamp wire when carrying and assembling the LCD device.

2. Description of the Related Art

Recently, information-processing devices are developing considerably to have various shapes and functions, and to process information more rapidly. Since a display device is indispensable to the information-processing device, the display device has alsobeen improved to keep pace with rapid developments of the information-processing device.

Until the present time, CRT (Cathode Ray Tube) monitors have mainly been used as a display device for various information-processing devices. However, recently the liquid crystal display (hereinafter referred to as "LCD") device that is light and small and requires only a little space has been developed with the features of a portable device. Such a device is being widely used as a display device for a computer, which is a typical information-processing device, a home television set that is hung on the wall and other information-processing devices.

Generally, the LCD device changes the specific molecular arrangement of the liquid crystal layer by applying a voltage to the liquid crystal layer, and it converts a variation in optical properties, such as birefringence, optical linearity, dichromatism, light scattering characteristic, etc., into a variation in visual properties. In other words, the LCD device displays information using light modulation by the liquid crystal cell.

Since the LCD device is a passive display device that does not generate a light by itself, it requires a back light assembly to supply light to the LCD device. The back light assembly includes a light source part for generating the light, and a light guide part for guiding the light generated from the light source part to an LCD panel on which an image is displayed. In a conventional LCD device, the light source part comprises one or more lamps and the light guide part is made in the form of a plate having a desired thickness.

The back light assembly, including the lamp, the light guiding plate and other supplementary members for generating and guiding light, is encased within in a container called a mold frame, thereby forming a mold frame assembly. Then, the LCD panel is secured on the mold frame assembly in a module assembly process, which completes the LCD device.

The lamp consumes 70% or more of a driving power of the LCD device; physical properties of the light guide part, such as shape, materials and the like, also have a strong relation to the size as well as the brightness of the LCD panel. Hence, the outward dimension and light efficiency of the LCD device will differ depending on the structure of the back light assembly, which influences mechanical and optical properties of the LCD device FIG. 1 is a perspective view showing a rear surface of the conventional mold frame assembly.

Referring to FIG. 1, a mold frame assembly 90 includes a back light assembly and a mold frame 10 containing the back light assembly. The back light assembly includes a lamp unit (not shown) for generating a light and a light guide unit (not shown) for guiding the generated light to an LCD panel (not shown) on which an image is displayed.

The lamp unit includes a lamp for generating the light (not shown), a lamp reflector (not shown) that surrounds the lamp and reflects the light radiated from the lamp towards the light guide unit in order to improve the light efficiency, an inverter (not shown) for supplying a modified alternating current to the lamp, and a pair of lamp wires 22 for connecting the inverter and the lamp electrically. The lamp wire 22 is fixed or secured by soldering an end of the lamp wire 22 to the lamp. A connector 24 is installed to the other end of the lamp wire 22 to connect the lamp wire 22 to the inverter with ease and safety.

The light guide unit includes a light guide plate (hereinafter, referred as LGP) for guiding the light generated from the lamp to the LCD panel, a reflection plate installed at a lower side of the LGP so as to reflect a leakage light from the LGP to the LCD panel, and optical sheets for enhancing a light concentration property toward the LCD panel. With the aforementioned elements, the light guide unit can convert into a plane light source for the LCD panel using a linear light source generated from the lamp unit disposed at a side edge portion of the LCD panel.

Preferably, the mold frame 10 has a rectangular parallelepiped box shape and an upper portion thereof is opened. Consequently, the mold frame 10 has four sidewalls and a bottom. On the outer surface of the bottom, a support portion 12 is formed to support and secure the printed circuit board bent vertically at a latitudinal side surface of the mold frame. On a part of a longitudinal side surface perpendicular to the latitudinal side surface, a joint portion 14 is formed to joint a chassis to the mold frame. The chassis (not shown) is jointed for bending the printed circuit board along the first side surface of the mold frame and securing the printed circuit board to the support portion 12. Furthermore, a wire entry 16 is also formed next to the joint portion 14 for entering the lamp wire that connects an electrical power source (not shown) disposing out of the mold frame with the lamp disposing in the mold frame.

The mold frame assembly 90 is assembled by rendering the lamp unit disposed at an inner side of the mold frame 10 and the light guide unit positioned to an opposite side of the lamp unit in the mold frame 10.

After being assembled, the mold frame assembly 90 is transferred to a module assembly process. In the module assembly process, the LCD panel for displaying an image is mounted on the upper portion of the mold frame assembly 90 and a chassis for securing the LCD panel to the mold frame is assembled to the joint portion 14. Consequently, an LCD device is assembled completely. On this occasion, the lamp wire 22 is drawn from the wire entry 16 and connected to the inverter (not shown) for supplying an electrical power to the lamp.

When the connector 24 is connected to the inverter (not shown) to operate the LCD device, an electrical power of alternating current is supplied to the lamp through the lamp wire 22 and thus light is generated from the lamp. Subsequently, the light is guided to the LCD panel by the light guide unit and an image is displayed on the LCD panel. Hence, the lamp wire 22 of the LCD device should always be drawn and exposed out of the mold frame 10 to be supplied a current for driving the back light assembly from an external power source.

However, the exposure of the lamp wire 22 causes a connection failure and a double securing operation of the lamp wire 22 is required in manufacturing the LCD device.

Since the lamp wire 22 is always exposed out of the mold frame 10 during the transfer process of the mold frame assembly 90 or during the module assembly process, unexpected tensile forces may be applied to the lamp wire 22 when the lamp wire 22 is entangled or caught on an obstacle. Hence, the unexpected tensile force causes the soldering connection at the connector 24 to be opened and thus a connection failure may occur. Accordingly, the electrical source power cannot be applied to the lamp due to the connection failure of the lamp wire.

To prevent the lamp wire 22 from entangling or being caught on an obstacle, the mold frame assembly 90 is transferred into the module assembly process under a circumstance with the lamp wire 22 being temporarily secured to the rear surface of the mold frame assembly 90 by an adhesive such as an adhesive tape. In the module assembly process, the adhesive is removed and then the mold frame assembly 90 is assembled. After the assembly process is completed, the lamp wire is again secured to the rear surface of the mold frame using adhesive tape. After that, the LCD device is packed into the shielding bag and is shipped.

Thus, the attaching of an adhesive for securing the lamp wire is twice done repeatedly in the transfer step of the mold frame assembly 90 and the shipping step of the LCD device, which increases material cost and processing time in manufacturing an LCD device.

SUMMARY OF THE INVENTION

The present invention has been made to solve the problems of the related art, and accordingly, it is an object of the present invention to provide an LCD device in which a lamp wire is secured to an outer surface of the mold frame in such a way that the lamp wires are secured and separated with ease and simplicity.

To accomplish the object of the present invention, there is provided an LCD device including an LCD panel for displaying an image, a back light assembly having a light supplying part, including a light source for generating a light and a lamp wire for supplying the light to the light supplying part, and a mold frame for receiving the backlight assembly and the LCD panel and having a securing member for securing the lamp wire. The securing member is a securing groove formed by cutting off into the side surface or a securing depressed portion formed by digging out into the rear surface of the mold frame to form a space receiving the lamp wire therein. A pair of securing ribs are formed on the bottom of the securing depressed portion facing each other, and the lamp wire is secured in the space between a pair of the securing ribs narrower than a diameter of the lamp wire.

According to an embodiment of the present invention, the lamp wire is secured to the outer surface of the mold frame to secure and separate the lamp wires with ease and simplicity.

Hence, the connection defect of the soldering portion due to a sway of the lamp wire is improved and it is no longer required to perform the double securing operation of the lamp wire in manufacturing the LCD device. Accordingly, material cost can be reduced and processing time can be lessened.

BRIEF DESCRIPTION OF THE DRAWINGS

The above and other objects and advantages of the present invention will become readily apparent by reference to the following detailed description when considered in conjunction with the accompanying drawings wherein.

DESCRIPTION OF THE PREFERRED EMBODIMENTS

Hereinafter, the present invention will be described in detail with reference to the accompanying drawings.

Figure 1:
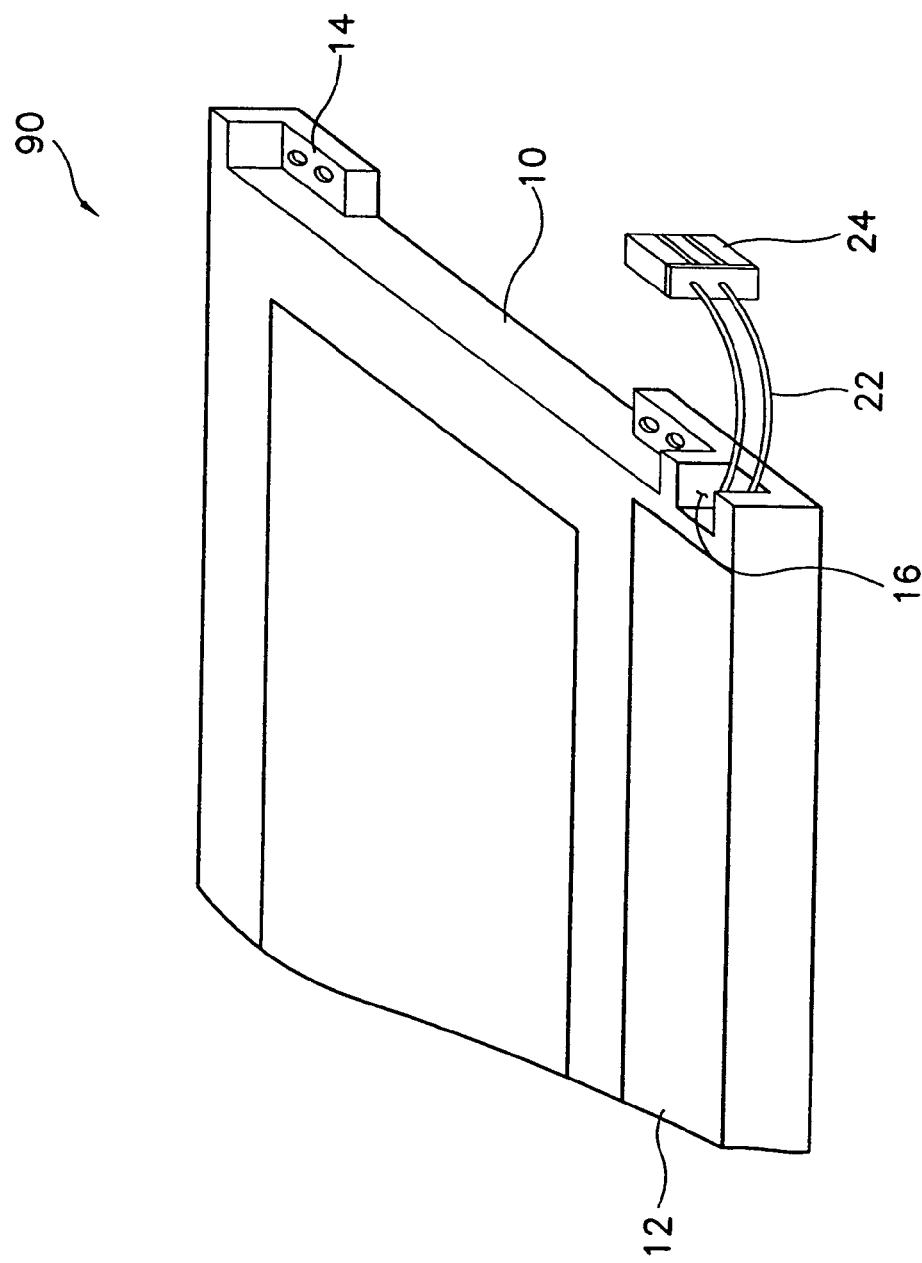
FIG. 1 is a perspective view showing a rear surface of the conventional mold frame assembly.
Figure 2:
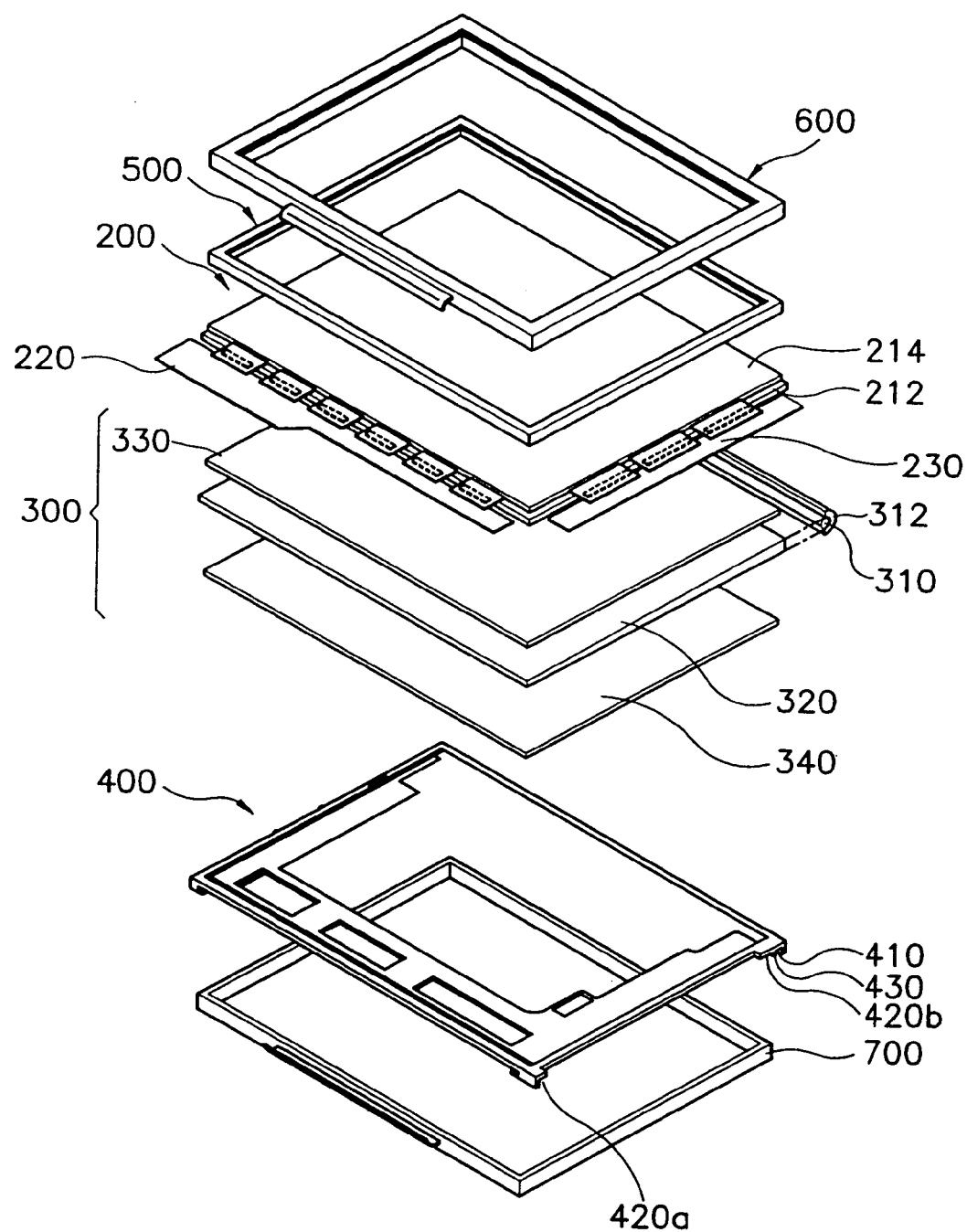
FIG. 2 is an exploded perspective view showing an LCD device having a securing groove according to a first embodiment of the present invention.

FIG. 2 is an exploded perspective view showing an LCD device having a securing groove according to a first embodiment of the present invention.

Referring to FIG. 2, an LCD of the first embodiment of the present invention has an LCD panel 200 for displaying an image, a back light assembly 300 for providing a light to the LCD panel 200, a mold frame 400 including the LCD panel 200 and the back light assembly 300 and for fixing a lamp wire (not shown) for electrically connecting the back light assembly 300 with an external power source (not shown), and a chassis 500.

The LCD panel 200 includes a thin film transistor (TFT) substrate 212, a color filter substrate 214, and a liquid crystal (not shown) interposed between the TFT substrate 212 and the color filter substrate 214.

The TFT substrate 212 is a transparent glass substrate on which TFTs in a matrix type are formed. A data line is connected to a source printed circuit board (PCB) 220, and a gate line is connected to a gate printed circuit board 230. A pixel electrode made of indium tin oxide (ITO), which is a transparent conductive material, is connected to a drain electrode.

The color filter substrate 214 faces the TFT substrate 212. The color filter substrate 214 is a substrate on which R, G, B color pixels are formed by a thin film forming process. The R, G, B pixels display colors when a light passes through them. A common electrode made of ITO is deposited on the entire surface of the color filter substrate 214.

A liquid crystal (not shown) is injected between the TFT substrate 212 and the color filter substrate 214. The optical properties of the liquid crystal can be controlled according to an aligning angle of liquid crystal molecules changed by a voltage applied to the TFT substrate 212.

When electrical signals are inputted to the data line and to the gate line through the source printed circuit board 220 and the gate printed circuit board 230, the TFTs are turned on or off. When the TFT is turned on, an electric field is formed between the pixel electrode of the TFT substrate 212 and the common electrode of the color filter substrate 214. The electric field changes the aligning angle of the liquid crystal molecules of the liquid crystal, so that the light transmittance rate is varied depending on the changed aligning angle, and thereby a desired picture is obtained.

The back light assembly 300 for providing a uniform light to the LCD panel 200 is provided below the LCD panel 200. The back light assembly 300 comprises a lamp unit and a light guiding unit.

The lamp unit includes a lamp 310 generating a light, a lamp reflector 312 wrapped around one side of the lamp 310, a lamp wire 314 (see FIG. 3) connecting electrically the lamp 310 and an outer electrical power source (not shown). The light guiding unit has a reflection plate 340, an LGP 320 and optical sheets 330.

A CCFL (Cold Cathode Fluorescent Lamp) is used for the lamp 310. The lights generated from the lamp 300 are incident through one side edge or both side edges of the LGP 320. Since the light is radiated from the lamp 310 in all directions, the light emitted in an opposite direction to the LGP is reflected to the LGP by the lamp reflector 312 to thereby enhance the light efficiency.

The LGP 320 is made of transparent material such as an acryl resin and, in one embodiment, is formed in a panel shape including an inclined rear surface and a flat front surface opposite to the inclined rear surface. According to another embodiment of the present invention, the LGP may be shaped such that the rear surface is flat and the front surface is inclined. The LGP 320 is located under the LCD panel 200, and the light generating from the lamp 310 is incident to the LCD panel 200 through the front surface after the light is guided throughout the LGP 320 via a side surface near the lamp 310.

The reflection plate 340 is located under the LGP 320 and the optical sheets 330 are located above the LGP 320 to improve light concentration efficiency.

The refection plate 340 functions to decrease a light loss by reflecting the light, which is not incident to the LCD panel 200 and is leaked from the rear surface of the LGP 320, in a direction towards the front surface of the LGP 320.

The optical sheets 330 are provided between the LGP 320 and the LCD panel 200 in order to enhance the light concentration efficiency of the light that is emitted from the LGP 320 and is inputted to the LCD panel 200 uniformly.

Although not shown in the drawings, another embodiment of the back light assembly in which a light source, such as one or more lamps, is disposed directly under the LCD panel without the LGP, (referred to as a direct type back light assembly) can also be provided, and as a matter of course, the scope of the present invention includes the direct type back light assembly.

The mold frame 400 supports and receives the LCD panel 200 and the back light assembly 300. The mold frame 400 preferably has a box-shape, and the upper portion of the mold frame is open. Namely, the mold frame 400 has four sidewalls and a bottom surface. The source printed circuit board 220 and the gate printed circuit board 230 are bent at the outer side surface of the mold frame, and a support portion for supporting and securing the bent portion of the source printed circuit board 220 and gate printed circuit board 230 are formed at the rear surface of the mold frame 400.

A wire entry 410 is formed at an end of a side surface of the mold frame 400 to expose the lamp wire 314 (see FIG. 3) outside the mold frame 400. Also, a first chassis coupling portion 420a and a second chassis coupling portion 420b are formed at both ends of the side surfaces of the mold frame 400 in which the wire entry 410 is formed. As a preferred embodiment of the present invention, a side portion of the mold frame 400 between the first chassis coupling portion 420a and the second chassis coupling portion 420b is removed to lighten the LCD device. A separating body 430 is positioned next to the wire entry 410 so as to separate the wire entry 410 from the second chassis coupling portion 420b. Namely, the separating body 430 is a part of the side portion of the mold frame 400 positioned between the wire entry 410 and the second chassis coupling portion 420b with a desired thickness.

Figure 3:
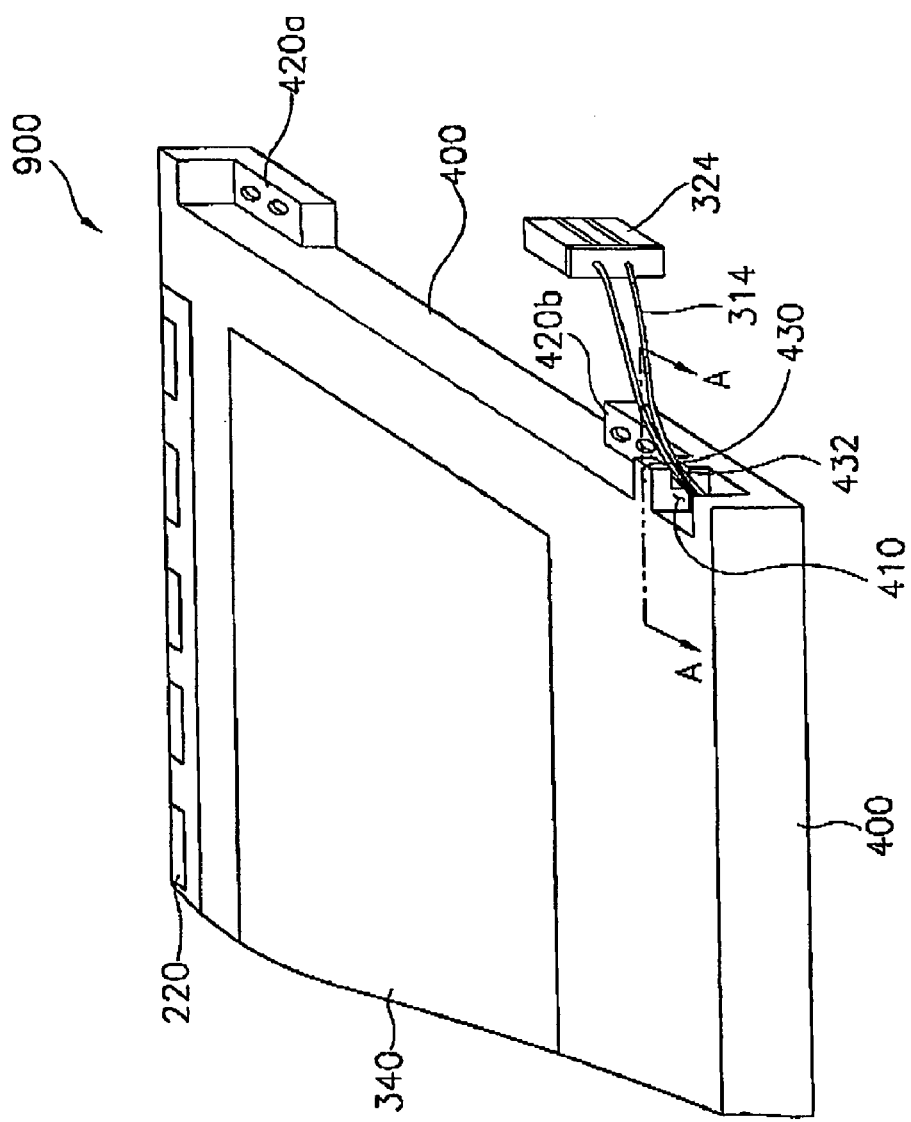
FIG. 3 is a perspective view showing a rear surface of the mold frame assembly of the LCD device shown in FIG. 2.

A securing groove 432, with reference to FIG. 3, is formed in a portion of the separating body 430 to secure the lamp wire. The securing groove 432 is formed so as to be slightly smaller than the diameter of the lamp wire 314 so that the lamp wire 314 is forcibly inserted and firmly secured into the securing groove 432. Securing means, such as a securing protrusion, an adhesive tape, a securing clip and the like, may be used to further ensure the securing of the lamp wire. Hence, the sway of the lamp wire can be prohibited. In addition, although unexpected tensile stress is applied to the lamp wire due to the entangling of the lamp wire or the lamp being caught on an obstacle, a resistant force against the tensile stress is generated on surfaces of the securing groove. Accordingly, disconnection of the lamp 310 and lamp wire 314 can be prohibited.

Referring again to FIG. 2, the chassis 500 preferably has a rectangular parallelepiped shape like the mold frame 400. In other words, an upper portion of the chassis 500 is opened to expose the LCD panel 200, and a side portion of the chassis 500 is vertically bent toward the mold frame 400 to cover the peripheral portion of the upper surface of the LCD panel 200. Accordingly, the chassis 500 causes the source printed circuit board 220 and the gate printed circuit board 230 to be bent along the outer surface of the mold frame 400 and secured to the bottom of the mold frame 400.

The back light assembly 300 is installed into the mold frame 400, thereby making the mold frame assembly. Then, in the module assembly process, the LCD panel 200 is assembled on the upper surface of the mold frame assembly and the chassis 500 is assembled to cover and fix the LCD panel 200 to the mold frame 400. Subsequently, a front case 600 and a rear case 700 are assembled, thereby completing the LCD device.

Thereafter, if the lamp wire 314 and the inverter (not shown) providing an alternative current are connected through a connector 324, the lamp 310 radiates a light and the light is provided to the LCD panel 200 through the LGP 320 to display an image on the LCD panel 200.

Figure 4:
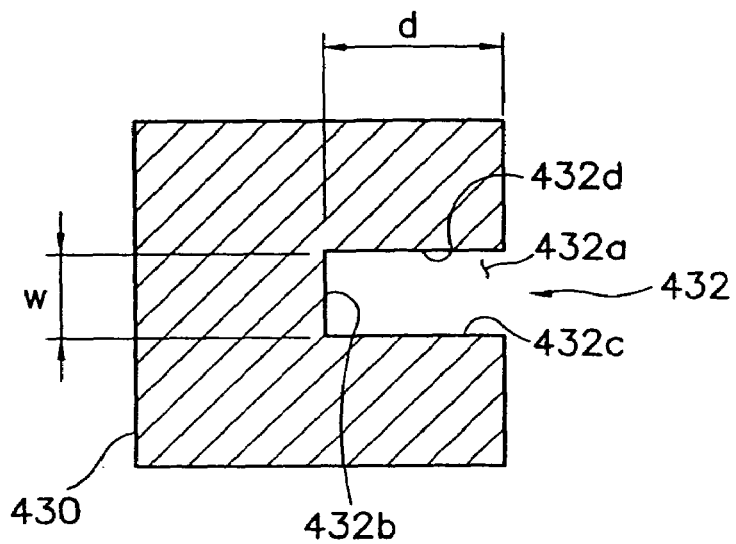
FIG. 4 is a cross sectional view showing a securing groove taken along the line A-A of FIG. 3.

FIG. 3 is a perspective view showing a rear surface of the mold frame assembly of the LCD device shown in FIG. 2, and FIG. 4 is a cross sectional view showing a securing groove taken along the line A-A of FIG. 3.

Referring to FIG. 3 and FIG. 4, the source printed circuit board 220 is bent backward along the side surface of the mold frame 400 and is secured to a side edge of the rear surface of the mold frame 400. At this time, the reflection plate 340 is revealed on the rear surface of the mold frame assembly 900. The separating body 430, which is a portion of the side portion of the mold frame 400, distinguishes the wire entry 410 from the second chassis coupling portion 420b.

As aforementioned, the securing groove 432 for securing the lamp wire 314 is formed in a side surface of the separating body 430 including an opening portion 432a for inserting the lamp wire 314, a bottom surface 432b of the securing groove 432 facing to the opening portion 432a, a first sidewall 432c and a second sidewall 432d perpendicular to the bottom surface 432b respectively and facing to each other. The lamp wire 314 is forcibly inserted into the securing groove 432 through the opening portion 432a.

A depth "d" of the securing groove 432, which is defined as a distance from the opening portion 432a to the bottom surface 432b, is formed deeply enough to receive both hot and cold wires of the lamp wire 314. Also, the width "w" of the securing groove 432, which is defined as a distance from the first sidewall 432c to the second sidewall 432d, is formed to be smaller than the diameter of the lamp wire 314.

Consequently, the lamp wire 314, including the hot and cold wires, is firmly secured within the securing groove 432, and thus the sway of the lamp wire 314 is restricted, so that the connection failure of the soldering portion of the lamp wire 314 is reduced. The width "w" of the securing groove 432 is in a range of more than 80%, preferably 90% of the diameter of the lamp wire 314, but less than the diameter of the lamp wire 314.

Furthermore, the securing groove 432 may further include a blocking wall (not shown) between the hot wire and the cold wire of the lamp wire 314 for isolating the hot wire and the cold wire electrically. The blocking wall improves an electrical stability of the lamp wire 314 by blocking an electrical interaction between the hot wire and the cold wire.

Hence, when an unexpected tensile force is applied to the lamp wire 314 due to entangling or being caught on an obstacle, a friction force is generated opposite to the direction of the tensile force on the surface of the lamp wire 314 of the securing groove 432. The friction force introduces a resistant force to the tensile force, and then the tensile force has no effect on the soldering portion connecting the lamp 310 and the lamp wire 314. Therefore, the connection failure of the soldering portion of the lamp wire 314 is reduced prominently.

Figure 5A:
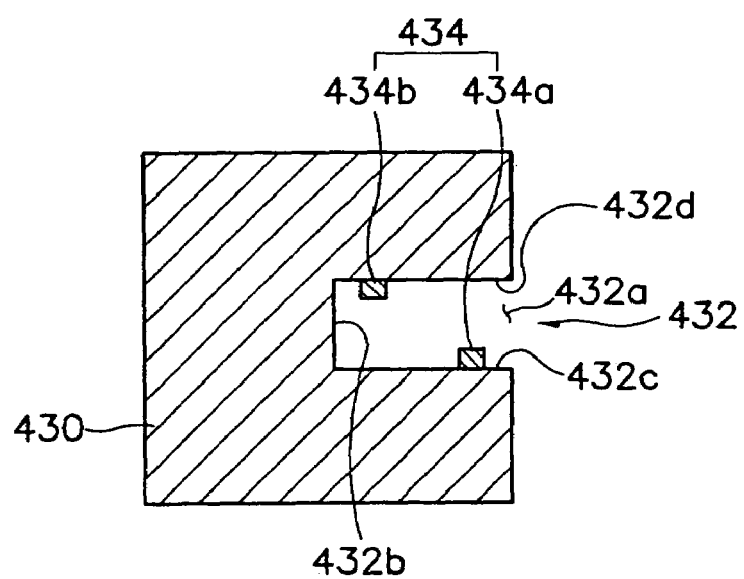
FIGS. 5A, 5B, and 5C are cross sectional views showing securing grooves having securing supplements according to another embodiment of the present invention.
Figure 5B:
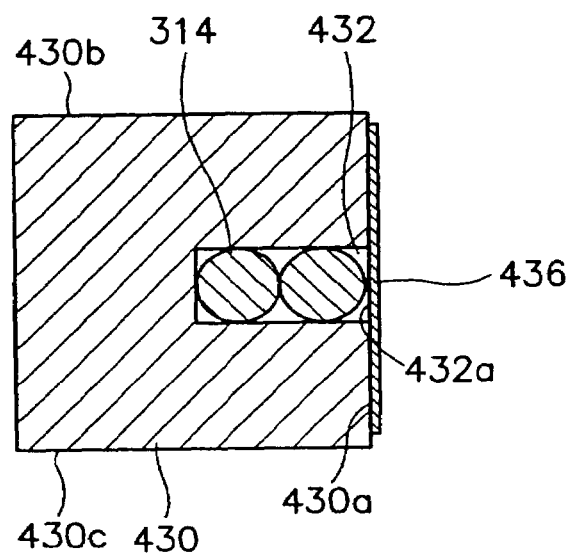
Figure 5C:
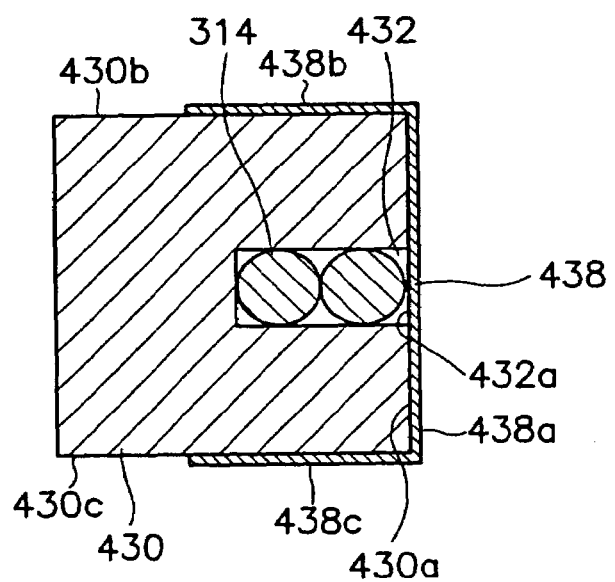

FIGS. 5A, 5B and 5C are cross sectional views showing securing grooves having securing supplements according to another embodiment of the present invention.

The lamp wire 314 is secured to the mold frame 400 more safely by use of various securing supplements, for example, securing protrusions 434 formed on the first sidewall 432c and second sidewall 432d of the securing groove 432 as shown in FIG. 5A, an adhesive tape 436, and a securing clip 438 as shown in FIGS. 5B and 5C, respectively.

Referring to FIG. 5A, the securing protrusion portion 434 is alternately formed on the first and second sidewalls 432c and 432d, including a first protrusion 434a and a second protrusion 434b, so that the securing protrusion portion 434 prevents the lamp wire 314 from being separated from the securing groove 432. Namely, the first protrusion 434a is protruded from the first sidewall 432c near the opening portion 432a of the securing groove 432, and the second protrusion 434b is protruded from the second sidewall 432d near the bottom surface 432b of the securing groove 432. As an embodiment of the securing protrusion portion 434, the first protrusion 434a and the second protrusion 434b can cross each other in the same cross sectional plane that includes the first protrusion 434a and the second protrusion 434b.

As a matter of course, positions of the first protrusion 434a and the second protrusion 434b may be exchanged with each other. Namely, the first protrusion 434a may be positioned on the second sidewall 432d near the opening portion 432a of the securing groove 432, and the second protrusion 434b may be positioned on the first sidewall 432c near the opening portion 432a of the securing groove 432. The securing protrusion portion 434 can be formed in any shape, but preferably, is formed as a cylindrical shape in consideration of ease of manufacturing.

The securing protrusion portion 434 prevents the lamp wire 314 inserted into the securing groove 432 from being separated from the securing groove 432 and therefore, ensures the securing of the lamp wire 314 to the securing groove 432.

Referring to FIG. 5B, an adhesive tape 436 is provided to cover the opening potion 432a of the securing groove 432 including the lamp wire 314. The adhesive tape 436 adheres to the entire side surface 430a of the separating body 430. Obviously, the adhesive tape 436 can extend to an upper surface 430b and bottom surface 430c of the separating body 430, although the adhesive tape 436 on the upper surface 430b and bottom surface 430c is not shown in the figures. The adhesive tape 436 covers up the opening portion 432a of the securing groove 432, and therefore prevents the lamp wire 314 from being separated from the securing groove 432.

Referring to FIG. 5C, the securing clip 438 is provided to cover the opening portion 432a of the securing groove 432 including the lamp wire 314. The securing clip 438 is made of elastic material having an excellent restoring force, and it is preferably made in a rectangular shape whose one side is open. The securing clip 438 comprises a body portion 438a, a first extending portion 438b and a second extending portion 438c. The body portion 438a of the securing clip 438 closes up the opening portion 432a of the securing groove 432 by covering the entire side surface 430a of the separating body 430. Also, the first extending portion 438b sticks to the upper surface 430b of the separating body 430 and the second extending portion 438c sticks to the bottom surface 430c of the separating body 430 by the restoring force of the securing clip 438.

The securing clip 438 prevents the lamp wire 314 inserted into the securing groove 432 from being separated from the securing groove 432 and therefore, ensures the securing of the lamp wire 314 to the securing groove 432.

By using the above-mentioned securing supplements, the lamp wire 314 providing a current to the lamp of the back light is tightly and safely secured to the mold frame 400. Consequently, the connection failure of the soldering portion due to the sway of the lamp wire 314 is reduced and the double securing process of the lamp wire 314 in manufacturing the LCD device is no longer necessary.

Although the side portion of the mold frame 400 between the first chassis coupling portion 420a and the second chassis coupling portion 420b is removed to lighten the LCD device according to the first embodiment of the present invention, the side portion does not need to be removed. Especially in a large LCD device for a computer or a television, the side portion of the mold frame 400 between the first chassis coupling portion 420a and the second chassis coupling portion 420b is not removed. In such a case, a securing portion may be formed on a portion of a side surface of the mold frame in a rectangular parallelepiped shape. Namely, the side surface of the mold frame is depressed to a desired depth to form the securing portion, and thus the securing portion has four sidewalls, a bottom surface and a space for receiving the lamp wire. At this time, a width of the securing depressed portion, defined as a distance between two longitudinal sidewalls of the first securing depressed portion, is formed to be smaller than a diameter of the lamp wire so that the lamp wire is firmly secured to the securing depressed portion.

Figure 6:
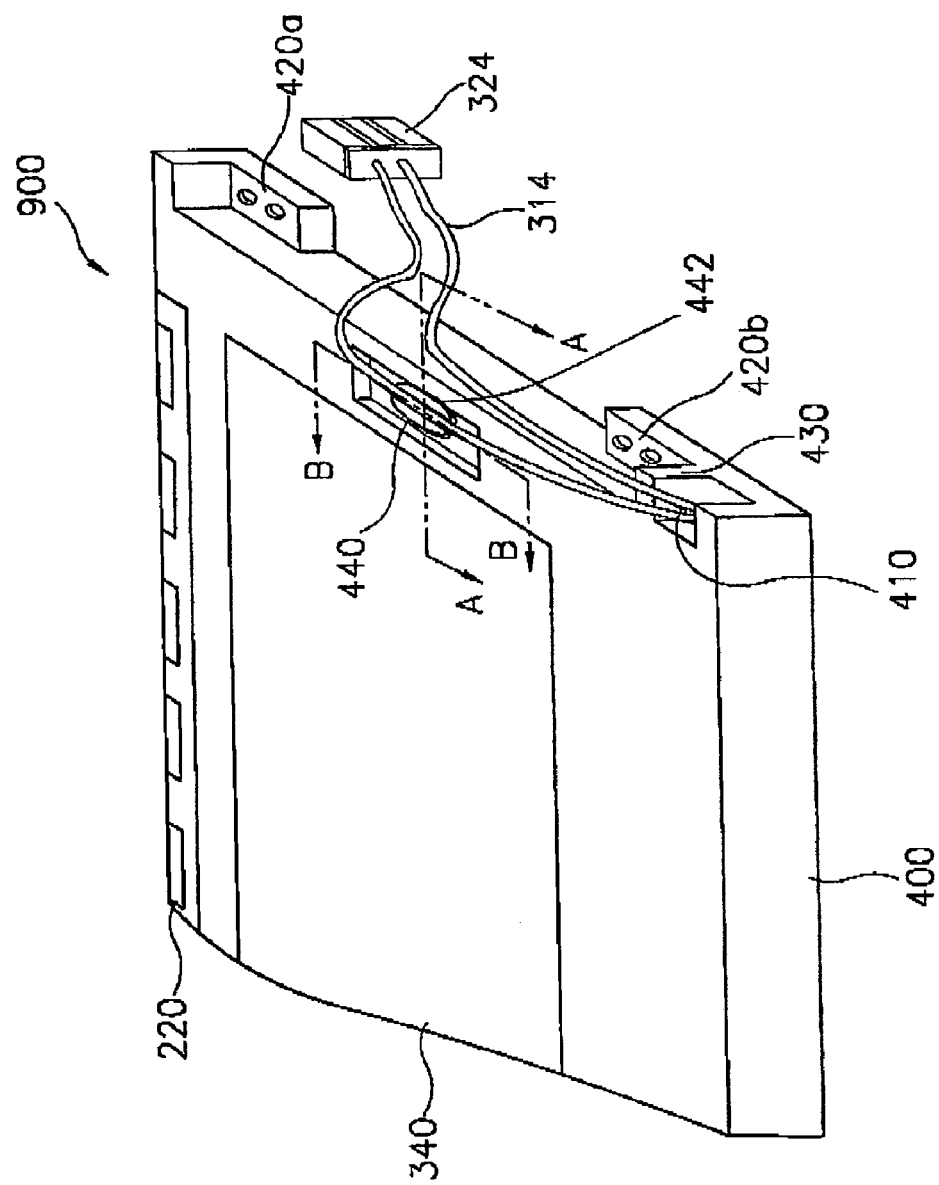
FIG. 6 is a perspective view showing a rear surface of the mold frame assembly having a securing portion according to a second embodiment of the present invention.

FIG. 6 is a perspective view showing a rear surface of the mold frame assembly having a securing portion according to the second embodiment of the present invention. In FIG. 6, members of the second embodiment of the present invention identical to those of the first embodiment of the present invention are designated by identical references.

Referring to the FIG. 6, the source printed circuit board 220 is bent along the outer side surface of the mold frame 400 and is secured to a side edge of the rear surface of the mold frame 400. The reflection plate 340 is revealed on the rear surface of the mold frame assembly 900. The separating body 430, which is a portion of the side portion of the mold frame 400, distinguishes the wire entry 410 from the second chassis coupling portion 420b.

A securing depressed portion 440 for further securing the lamp wire 314 to the mold frame 400 is formed beside the reflection plate 340. The rear surface of the mold frame 400 is dug out to a desired depth and the securing depressed portion 440 has a space for receiving the lamp wire 314 therein.

The securing depressed portion 440 preferably has a rectangular parallelepiped shape with two latitudinal sidewalls, two longitudinal sidewalls and a bottom surface as an embodiment of the securing depressed portion 440. As a result, the securing depressed portion 440 has a space for receiving the lamp wire 314. As an embodiment of the securing depressed portion 440, a width of the securing depressed portion 440, which is defined as a distance between the two longitudinal sidewalls of the securing depressed portion 440, is smaller than a diameter of the lamp wire 314. Therefore, the lamp wire 314 is forcibly and firmly secured into the securing depressed portion 440.

The securing depressed portion 440 further includes a pair of securing ribs 442 to clamp the lamp wire 314 firmly as another embodiment of the securing depressed portion 440. The securing depressed portion 440 is formed to have an enough space to receive a pair of the securing ribs 442 and the securing ribs 442 are installed on the bottom surface of the securing depressed portion 440 facing to each other and having a space between the securing ribs 442 for receiving the lamp wire 314 therein.

The pair of the securing ribs 442 is formed in a semicircular shape and thus they face to each other apart by a desired distance from each other. Therefore, there is provided a securing space having a width corresponding to the distance between a pair of the securing ribs 442 and a height corresponding to a thickness of the securing ribs 442, the width of the securing space being smaller than a diameter of the lamp wire 314. Consequently, the lamp wire 314 is secured to the mold frame 400 by forcibly inserting the lamp wire 314 into the securing space.

When an unexpected tensile force is applied to the lamp wire 314, a friction force is generated opposite to the direction of the tensile force on the surface of the lamp wire 314 by a clamping force of the securing ribs 442. Accordingly, the friction force introduces a resistant force to the tensile force, and then the tensile force has no effect on the soldering portion connecting the lamp 310 and the lamp wire 314. Therefore, the connection failure of the lamp wire 314 is reduced prominently, and the lamp wire 314 is prevented from entangling in transferring the mold frame assembly to the module assembly process. Furthermore, if necessary for the module assembly process, the lamp wire 314 can be separated from the mold frame 400 by pulling out the lamp wire 314 after widening the gap between the pair of the securing ribs 440 by applying an external force to the securing rib 440.

Accordingly, the lamp wire 314 is easily secured to the mold frame 400 without additional securing supplements and modifying an original dimension of the mold frame 400. Also, the lamp wire 314 can be separated from the mold frame 400 with ease, if necessary.

As compared with a conventional manufacturing process of an LCD device in which the lamp wire 314 adheres to the mold frame 400 by an adhesive, the adhesive is removed in the module assembly process, and finally the lamp wire 314 again adheres to the mold frame, a manufacturing cost of the LCD device according to the present invention is reduced since the adhesive is no longer necessary, and a process time is also reduced since a double securing step repeatedly required for securing the lamp wire 314 to the mold frame 400 is no longer necessary.

Either the cold wire or the hot wire is secured to the mold frame 400 in the second embodiment of the present invention, but both the cold wire and the hot wire can be secured to the mold frame 400 by widening the gap of the securing ribs 442.

Figure 7A:
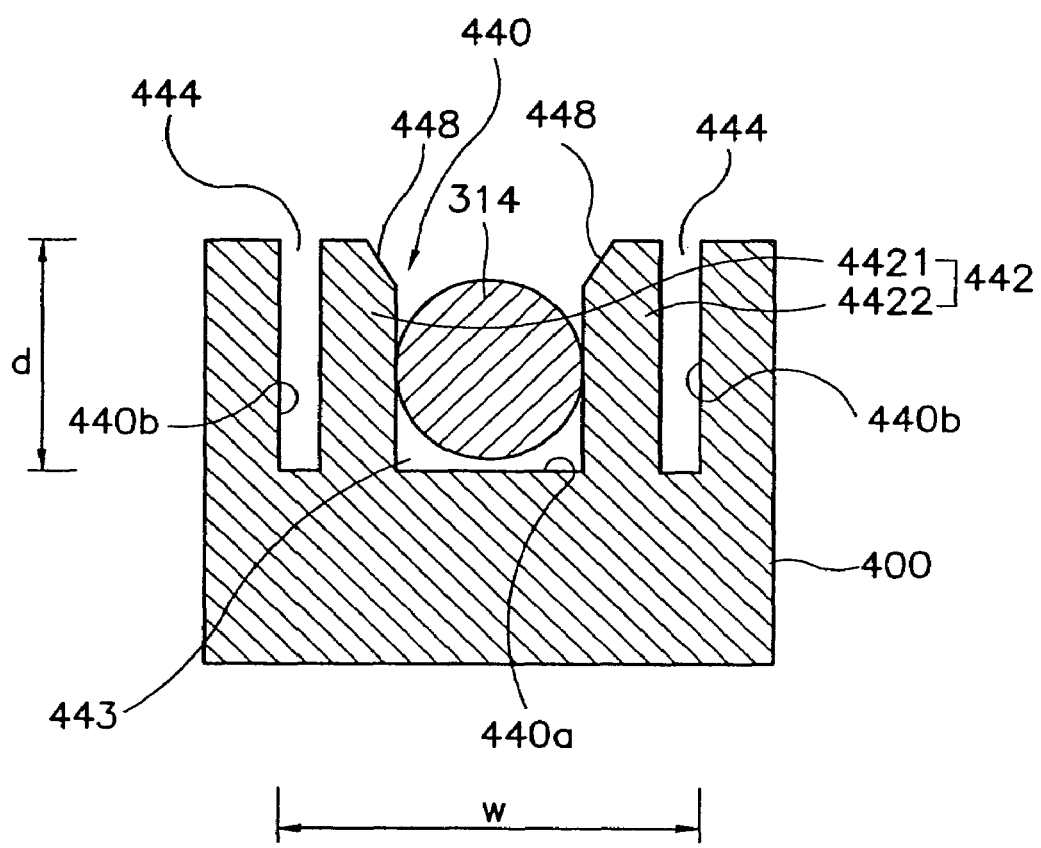
FIG. 7A is a cross sectional view showing a securing portion taken along the line A-A of FIG. 6.
Figure 7B:
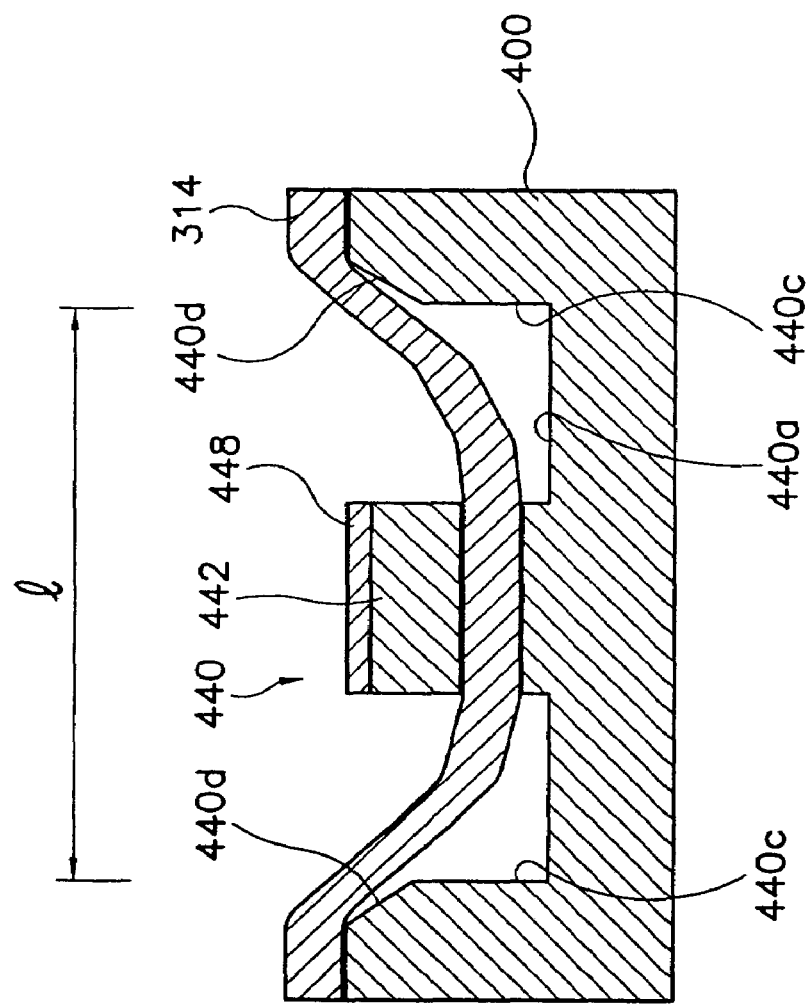
FIG. 7B is a cross sectional view showing a securing portion taken along the line B-B of FIG. 6.

FIG. 7A is a cross sectional view showing a securing depressed portion taken along the line A-A of FIG. 6, and FIG. 7B is a cross sectional view showing a securing depressed portion taken along the line B-B of FIG. 6.

Referring to FIGS. 7A and 7B, a securing depressed portion 440 is formed to have a desired depth (d) by digging out the rear surface of the mold frame 400 and therefore, comprises two longitudinal sidewalls 440b, two latitudinal sidewalls 440c, and one bottom surface 440a. Accordingly, the securing depressed portion 440 is defined by a desired width (w), length (l) and depth (d).

A pair of the securing ribs 442, including a first rib 4421 and a second rib 4422, are protruded upwardly in the middle of the bottom surface 440a of the securing depressed portion 440, and the first rib 4421 and the second rib 4422 are positioned facing to each other apart at some distance and they have a predetermined height. A securing space 443 for receiving the lamp wire 314, which is defined by the bottom surface 440a of the securing depressed portion 440 and inner side surfaces of the first rib 4421 and the second rib 4422, is formed to have a width, which is a distance between the first rib 4421 and the second rib 4422, smaller than a diameter of the lamp wire 314 so that the lamp wire 314 is forcibly and firmly secured into the securing space 443. Furthermore, each of the first and second securing ribs 4421 and 4422 is positioned apart from each longitudinal sidewall 440b at a desired distance, thereby forming a bump space 444. The bump space absorbs an elastic deformation of the securing ribs 442

As an embodiment of the second embodiment of the present invention, the width of the securing space 443 is in a range of more than 80%, preferably 90% of the diameter of the lamp wire 314, but less than the diameter of the lamp wire 314, and hence the lamp wire 314 is forcibly and firmly secured into the securing space. 443 by a frictional force between the surface of the securing ribs 442 and the lamp wire 314. When the lamp wire is inserted into the securing space 443, an elastic deformation of the first rib 4421 and the second rib 4422 due to a tight insertion of the lamp wire 314 is absorbed in the bump space 444.

Furthermore, the first rib 432*a* and the second rib 432*b* include a first chamfer surface 448 formed along an upper edge portion of the inner surface of the first rib 432*a* and the second rib 432*b*, so that the lamp wire 314 is smoothly inserted into the securing space 443 and easily pulled out from the space 449 without rubbing with the upper edge portion of the inner surface of the securing rib 432. Also, as shown in FIG. 7B, a second chamfer surface 440*d* is also formed along an upper edge portion of the inner surface of the latitudinal sidewall 440*c* to prevent the lamp wire 314 from being rubbed against the upper edge portion of the inner surface.

Accordingly, at first, the lamp wire 314 is inserted into the securing space 443 between the first rib 4421 and the second rib 4422 by an external force so that the lamp wire 314 is secured to the mold frame 400, and, in case the lamp wire 314 is required to move again, the lamp wire 314 is simply separated from the mold frame 400 by widening the gap between the first rib 4421 and the second rib 4422 and pulling out the lamp wire 314 from the securing space 443. In other words, the lamp wire 314 is secured to the mold frame 400 in such a way that a securing and a separation of the lamp wire are performed with ease and simplicity.

Figure 8:
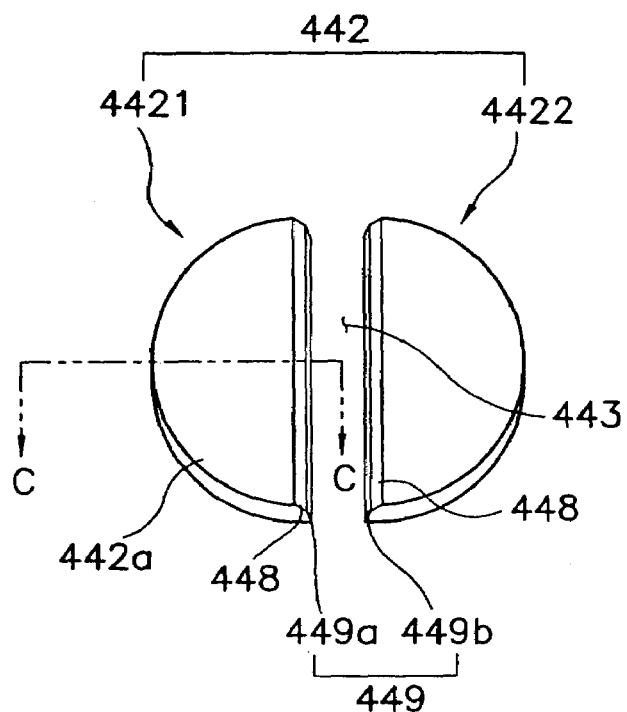
FIG. 8 is a perspective view showing the securing rib shown in FIG. 6 according to an embodiment of the present invention.

FIG. 8 is a perspective view showing the securing rib shown in FIG. 6.

Referring to FIG. 8, as a preferred embodiment of the present invention, the first rib 4421 and the second rib 4422 have a semicircular shape. Each of the first and second fixing ribs 4421 and 4422 includes a securing surface 449 having a rectangular side surface and a circumferential side surface, and thus the securing rib 442 has a first securing surface 449*a* and a second securing surface 449*b*. At this time, the first securing surface 449*a* and the second securing surface 449*b* face each other and are separated at a desired distance. Consequently, a securing space 443 is provided between the first securing surface 449*a* and the second securing surface 449*b* for receiving the lamp wire 314. Namely, the securing space 443 is defined by the first securing surface 449*a*, the second securing surface 449*b* and the bottom surface 440*a*.

First chamfer surfaces 448 are formed along upper edge portions of the first securing surface 449*a* and the second securing surface 449*b* with a desired chamfer angle to prevent a damage of the lamp wire 314 due to a rubbing against the upper edge portions of the securing surface 449. Hence, the height of the securing surface 449 is lower than the height of the securing rib 442. The height of the fixing rib 442 can be adjusted properly, if necessary, within the depth of the securing depressed portion 440.

The first chamfer surfaces 448 of the first rib 4421 and the second rib 4422 are symmetrical to each other, and thus the first chamfer surface 448 of the first rib 4421 is described in detail as follows.

Figure 9:
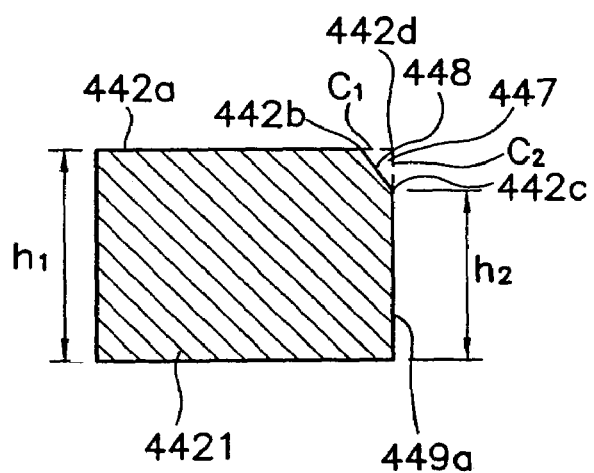
FIG. 9 is a cross sectional view of the first rib taken along the line C-C of FIG. 8.

FIG. 9 is a cross sectional view of the first rib taken along the line C-C of FIG. 8.

Referring to FIG. 9, a chamfer line 4481, which is an arbitrary cross sectional line of the first chamfer surface 448, is formed by cutting off an upper corner portion 447 of the first securing surface 449*a* from the first rib 4421. Preferably, the upper corner portion 447 is shaped in a right-angled triangle having a base line $C_1$ and a height $C_2$. The base line $C_1$ has a distance from an upper corner point 442*d* of the first securing surface 449*a* to a first point 442*b* set on an upper surface 442*a* of the first rib 4421, and the height of right-angled triangle $C_2$ has a distance from the upper corner point 442*d* of the first securing surface 449*a* to a second point 442*c* set on the first securing surface 449*a*. Accordingly, when the upper corner portion 447 shaped in a right-angled triangle is cut off, the chamfer line 4481 is formed at an upper portion of the first rib 4421 as an inclined line corresponding to a hypotenuse of a right-angled triangle.

A normal vector of the first chamfer surface 448 is determined by the chamfer angle. The chamfer angle is defined as an angle between the base line $C_1$ and the hypotenuse of a right-angled triangle. Since the hypotenuse of a right-angled triangle is a line connecting the first point 442*b* and the second point 442*c*, the chamfer angle is determined by a ratio of $C_1$ and $C_2$.

In other words, a distance from the upper corner point 442*d* to the first point 442*b* and a distance from the upper corner point 442*d* to the second point 442*c* determine the dimension and the direction of the first chamfer surface. Accordingly, the height of the securing surface $h_2$ is lower than the height of the securing rib $h_1$.

As a preferred embodiment of the present invention, the first chamfer surface 448 is formed such that the base line $C_1$ and the height of the right-angled triangle $C_2$ are the same and hence, the chamfer angle is 45 degrees. The structure of the first chamfer surface 448 and a method of forming the first chamfer surface 448 are identically applied to the second chamfer surface formed on the upper edge of the inner surface of the latitudinal sidewall 440*c* of the securing depressed portion 440.

Figure 10:
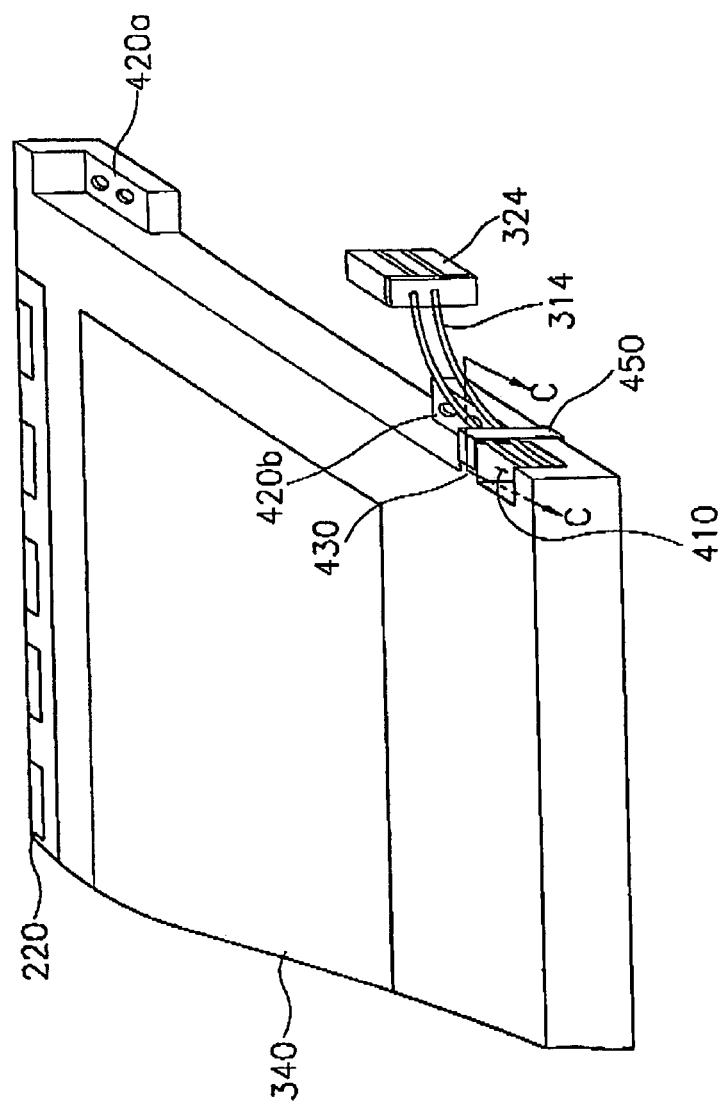
FIG. 10 is a perspective view showing a rear surface of the mold frame assembly having a securing member according to a third embodiment of the present invention.

FIG. 10 is a perspective view showing a rear surface of the mold frame assembly having a securing member according to a third embodiment of the present invention.

Referring to FIG. 10, a securing clip 450 for securing the lamp wire 314 is installed to an outer surface of the separating body 430 and renders the lamp wire 314 secured to the outer surface of the separating body 430. When the lamp wire 314 is secured to the separating body 430, it is compressed between the outer surface of the separating body 430 and an inner surface of the securing clip 450, and then a friction force generated on the surface of the lamp wire 314 prevents a sway of the lamp wire 314. Accordingly, the lamp wire 314 can be secured to the mold frame 400 without an additional modification of the separating body 430

Figure 11:
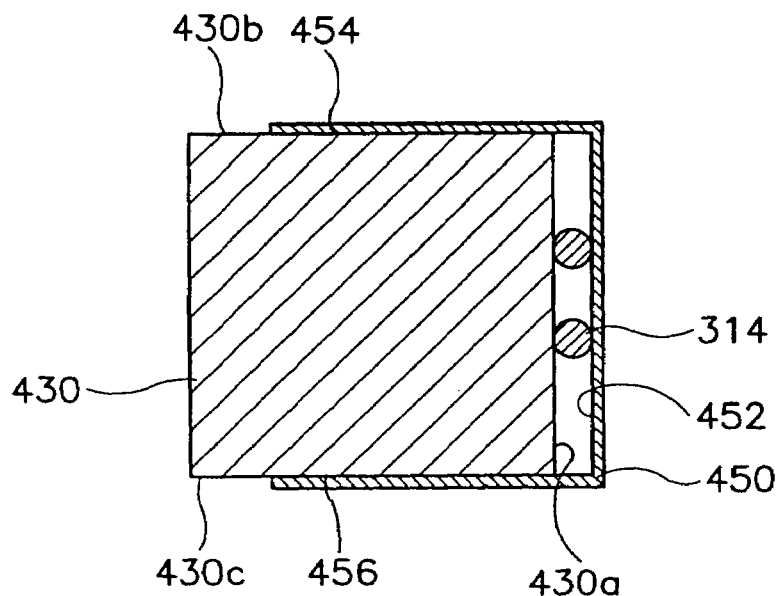
FIG. 11 is a cross sectional view of the securing member taken along the line C-C of FIG. 10.

FIG. 11 is a cross sectional view showing a securing member of the lamp wire 314 taken along the line C-C of FIG. 10.

As shown in FIG. 11, the securing clip 450 is made of elastic material having an excellent restoring force, and comprises a body 452, a first extending portion 454 and a second extending portion 456. The body 452 compresses the lamp wire 314 to the outer surface of the separating body 430. Also, the first extending portion 454 sticks to the upper surface 430*b* of the separating body 430 and the second extend portion 456 sticks to the bottom surface 430*c* of the separating body 430 by the restoring force of the fixing clip 450. As another embodiment of the securing clip 450, the securing clip 450 may further include a prominent portion on an inner surface of the first extending portion 454 and the second extending portion 456 to reinforce the joint of the securing clip 450 and the separating body 430.

Figure 12:
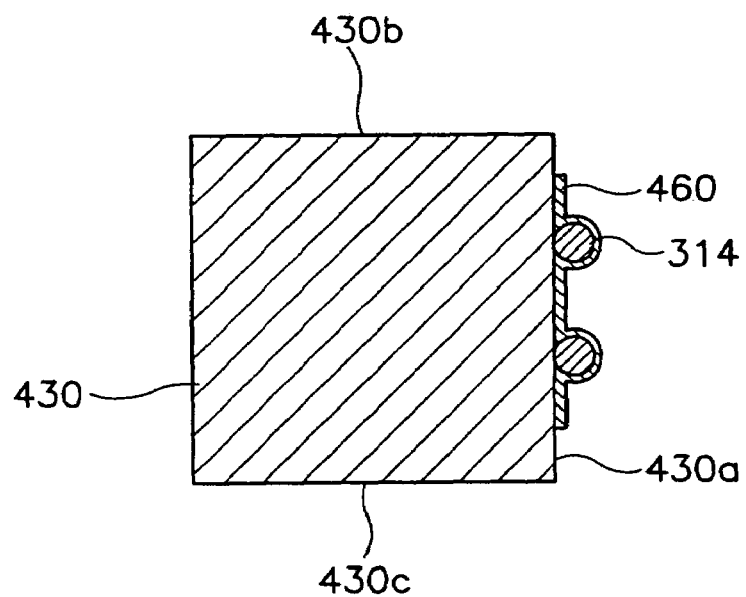
FIG. 12 is a cross sectional view of the securing member in which an adhesive tape is substituted for the clip shown in FIG. 11.

FIG. 12 is a view showing an adhesive tape substituting for the securing clip of FIG. 11.

Referring to FIG. 12, an adhesive tape 460 is adhered to the outer surface 430a of the separating body 430 to secure the lamp wire 314. The hot wire and a cold wire are spaced apart from each other at a sufficient distance such that an adhering surface between the adhesive tape 460 and the outer surface 430a is secured as wide as possible, thereby preventing a current leakage due to a contact of the hot wire and the cold wire. Also, the adhesive tape 460 may be extended to the upper surface 430b and the bottom surface 430c of the separating body 430.

Consequently, the connection failure of soldering portion due to sway of the lamp wire 314 is reduced and it is no longer required to repeat the process of securing the lamp wire 314 in manufacturing the LCD device. Also, the chamfer surface prevents the damage of the lamp wire 314 due to a friction with an edge line of the securing rib and securing the depressed portion 440.

According to the present invention, a securing portion or member secures the lamp wire 314 to the mold frame in such a way that fixation and separation of the lamp wire 314 is performed with ease and simplicity and it reduces the connection defect of the soldering portion of the lamp wire 314 due to a sway of the lamp wire, and an entangling the lamp wire 314 prevented.

Furthermore, it is no longer necessary to repeatedly attach an adhesive in the moving step of the mold frame assembly and in the shipping step of the LCD device.

While the present invention has been described in detail, it should be understood that various changes, substitutions and alterations could be made hereto without departing from the spirit and scope of the invention as defined by the appended claims.

What is claimed is:

1. A liquid crystal display (LCD), comprising:
   an LCD panel;
   a backlight assembly comprising a lamp wire and a light supplying part including a light source; and,
   a mold frame receiving the backlight assembly and the LCD panel and having a depressed portion formed on a surface of a rear side thereof,
   wherein a securing member is formed on the depressed portion to receive and secure at least a portion of the lamp wire.

2. The LCD of claim 1, wherein the securing member comprises at least two securing ribs.

3. The LCD of claim 2, wherein a distance between the securing ribs is less than a diameter of the lamp wire.

4. The LCD of claim 1, wherein the depressed portion has a parallelepiped shape.

5. The LCD of claim 1, wherein the depressed portion has a bottom surface, and the securing member is disposed on the bottom surface.

6. The LCD of claim 1, wherein the depressed poition is spaced apart from an end portion of a lamp by a predetermined distance.

* * * * *